Aug. 5, 1947.                H. McCURDY                  2,425,110
       MEANS INCLUDING A HELICAL RAMP FOR CENTRIFUGALLY
              SEPARATING SOLIDS FROM LIQUIDS
                    Filed Sept. 18, 1944
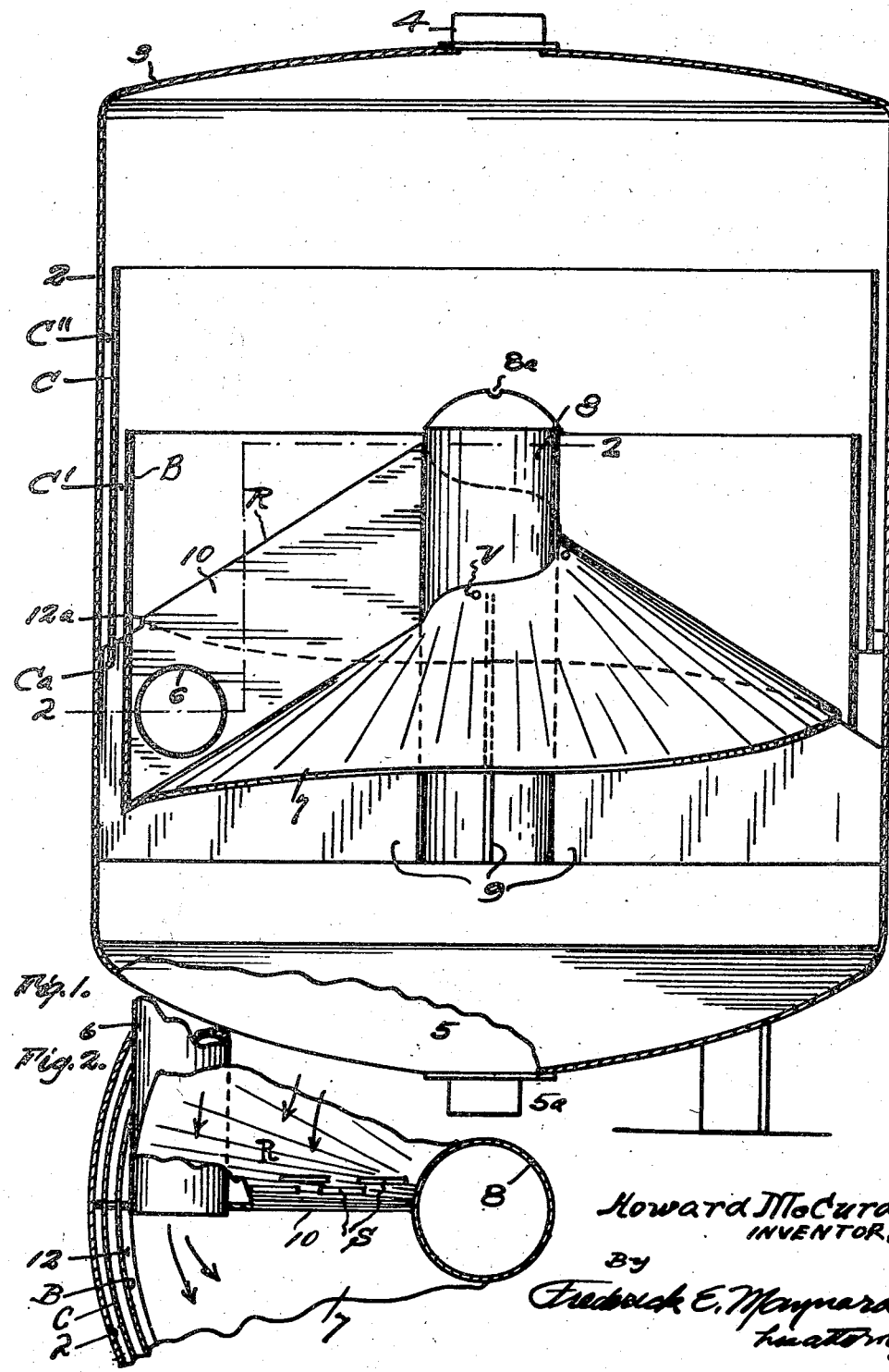
Howard McCurdy,
     INVENTOR;
By
Frederick E. Maynard.
        his attorney Patented Aug. 5, 1947

2,425,110

UNITED STATES PATENT OFFICE 2,425,110

MEANS INCLUDING A HELICAL RAMP FOR CENTRIFUGALLY SEPARATING SOLIDS FROM LIQUIDS

Howard McCurdy, Walnut Park, Calif.

Application September 18, 1944, Serial No. 554,696

8 Claims. (Cl. 210—51)

The discovery set forth here is an improved, helical, centrifugal separator of the class shown in McCurdy Patents Numbers 2,229,860 and 2,300,129.

It is an object of this invention to facilitate and accelerate separation of different sizes and weights of particles which are suspended in moving bodies of fluids, particularly in liquids incident to industrial practices and also to water treatment where it is highly desirable that solids and other objectionable matter be removed to 100% efficiency in all practical cases.

An object is to so advance this type of separator that higher velocity of flow and smaller vessels of very high efficiency may be available.

Particularly, an object is to provide means to hasten the ultimate, very high separation of the undesired particles by a preliminary off-casting of the heaviest and then (all in operation at one time) casting off the medium and lighter particles in a separate cut stream or streams and eliminating the possible return of these cuts back into the active zone of influence of separation of the heavier components.

An object is to provide a multiple cut separator involving means permitting a fast whirl of fluid to effect preliminary cut or cast-off of the heavier particles and then to effect a suitable reduction of speed of flow for settling out of the remaining medium and light particles; all in a common separating chamber.

Also, an object of the invention is to provide settling ducts always keeping the heavier particles apart from the later cut-out lighter particles until ultimate discharge of both to a common collecting basin of the separator.

The discovery consists of certain advancements in this art as set forth in the ensuing text and having, with the above, additional objects and advantages as hereinafter developed, and whose constructions, combinations and details of means will be made manifest in the following specification of the herewith illustrative embodiment, as, also, will the manner of operation; it being understood that modifications, variations and adaptations may be resorted to within the scope, spirit and principle of the invention as more directly claimed herein presently.

Figure 1 is a vertical, axial section of the separator.

Figure 2 is a cross-section on line 2—2 of Fig. 1, of a fragment of the separator.

In a very highly efficient (close to if not one-hundred per cent in actual use) separator of the instant invention there is embodied a cylindrical shell 2 of suitable dimensions and having a dome 3 with a center, treated fluid outlet 4. A bowl shaped bottom 5 constitutes a collecting basin with a sediments discharge fitting 5a by which the cast-off and collected matter may be tapped out from time to time.

A horizontal supply or inlet tube extends tangentially from and in close relation to the circular wall of the shell 2. Springing from the lower edge of the mouth of the tube 6 (in the chamber of the shell) there is a helical ramp 7, about a vertical axis, whose top surface for its full length inclines outwardly and downwardly towards its outer edge or perimeter to accelerate gravitational flow of such components of the fluid travelling through the chamber as settles on the ramp.

The ramp is snugly fitted about a central, hollow column 8 suitably fixed in the shell and terminating well above the bottom 5 and open at the bottom end, and having a closed top with a small vent 8a for escape of collecting air. Radial arms 9 from the column 8 support the ramp and engage the wall of the shell 2 and form a stationary baffle to reduce whirl of fluid standing in the basin.

Fluid rapidly flowing onto the ramp from the tube 6 will at once begin to rotate in a helical path up the ramp 7, which is here shown as one full helical turn with the high point of the ramp at about the top of the column 8.

A distinct feature of the instant invention is the provision of means to make a clear separation of the first cast-off matter (as for instance sand grains) from lighter and later cast-off fines and lighter particles like silt and to first drop the heavy grains to the basin and later drop out the lighter particles without danger of the lighter particles being again tumbled from the radial ridge of the ramp over onto the new, incoming stream of fluid.

As here shown the ramp is encircled by an inner cylinder B whose lower edge preferably conforms to the helix-rim of the ramp 7, which latter is slightly smaller in diameter than the said cylinder to provide what can be called a sand orifice 12 opening to the settling space immediately below the bottom face of the ramp and subdivided by the vertical-plane arms 9. The top edge of the cylinder lies in a horizontal plane well above the highest point 12a of the helical orifice 12 so that all heavy particles gravitating toward this orifice will fall at once to the space under the ramp.

The inner end of the tube 6 terminates square-cut with its plane substantially radial to the axis of the concentric shell and the cylinder B, Fig. 2, and this inner end is sealed in a vertical, plane, radial plate which stands from the lower or entry end of the ramp 7 to its upper or ridge end, Fig. 1, and seals with the same along joints made by the inclined ends of the ramp, with which the top and bottom edges of the plate 10 are cut to conform.

This plate seals at its vertical end edges with the cylinder B and the column 8 and therefore when the impregnated fluid issues from the mouth of the tube 6 it, the fluid, immediately impinges the ramp and is by this started on an unchecked, helical sweep to the top end or radial ridge of the ramp from which the fluid then continues in a helical swirl in the unobstructed space between the dome and the ramp top end. The heaviest particles are quickly projected to the rim orifice 12 and thence fall to the basin; swirl being here checked by the spider arms 9. Some of the solids will repose on the ramp until the top of the ramp is reached and there it is dropped off the ridge R and will eventually reach the orifice 12. But the lighter particles which do not settle in the cylinder defined space pass to the cylinder rim and are thrown outwardly in the structure shown to an intermediate cylinder C spaced concentrically about the cylinder whereby is formed an annular settling channel C' which at no place opens to the cylinder space, and the fine material swept off the ramp ridge is not compelled to descend onto or toward the lower end of the ramp but simply whirls until it reaches the rim of the cylinder whereat it cuts down into the channel C'.

The greater diameter of the cylinder C causes a reduction in axial fluid speed and gives more time for settlement of cut-out particles, and they ultimately drop at the helical bottom edge of the cylinder to the collecting space under the ramp. No grains on the ramp rim are led to the space C'. There is a further and finer cut of the solids or objectionable material over the high rim of the deeper cylinder C which is spaced inwardly from the shell to form a settling passageway C''; the bottom edge Ca of the cylinder being on a plane just below the highest point of the helical orifice 12. The settling spaces C' and C'' at no point feed back to the top of the ramp 7.

The ramp is provided along its seal with the column 8 with suitable air vents V.

It may be desirable in some cases to provide the ridge margin of the ramp with escape for grains or solids in case of overload, and suitable slots S are shown in Fig. 2 for escape of lodged grains in such a case, to avoid re-feed onto the incoming fluid.

What is claimed is:

1. A centrifugal separator having a cylindrical shell provided with an inlet tube having its discharge end in, and on a plane radial to the shell, an outlet from the upper part of the shell, an inner cylinder spaced concentrically as to the shell and ending short of its top and bottom, and a helical ramp beginning at said discharge end of the tube; the bottom edge of the cylinder being a helix conforming to and spaced from the rim of the ramp for the full length of the ramp; said cylinder forming with the shell an annular escape passage for material centrifugally thrown over the top edge of the cylinder and a central, vertical element about which the ramp winds.

2. A centrifugal separator having a shell and a cylinder concentrically spaced in the shell and ending short of its top and bottom and having a helical bottom forming a ramp and the rim of which bottom is spaced from the surrounding cylinder to form an escape orifice for material settling thereon, a central wall for the ramp; the shell and the cylinder forming a discharge passage for gravitation of materials thrown over the top edge of the cylinder apart from the material settling in the cylinder to the ramp bottom, an inlet feeding onto the bottom end of the ramp, and an outlet in the upper part of the shell.

3. A centrifugal separator having a shell, a helical ramp in the shell having a central wall part, and a plurality of concentric walls interposed between the ramp and the shell and ending short of its top and bottom and spaced relatively and as to the shell to form annular settling passageways for material thrown over their top edges; the rim of the ramp being spaced from the innermost wall to form a discharge orifice for sediment falling to the ramp, an inlet discharging onto the lower end of the ramp, and an outlet higher in the shell than the ramp.

4. The separator of claim 3; the margin of the face of the top end of the helical ramp having escape apertures for settled material approaching said end; whereby to avoid their return onto fluid on the lower portion of the ramp.

5. The separator of claim 3; the top edges of the said walls being at horizontal planes not lower than the highest point of the bottom edge of the ramp.

6. The separator of claim 3; the upper edges of the concentric walls being at different levels.

7. The separator of claim 3; the upper edge of the outer wall being higher than that of the inner wall.

8. In a fluid separator, a vertical shell having an outlet in its upper part, an inner cylinder spaced concentrically in the shell and being open at its top and at its bottom into the shell chamber and the cylinder and the shell forming therebetween a settling space constituting an escape passageway for the heavier constituents in the fluid whirled over the rim of the cylinder by centrifugal force acting on the contents of the cylinder, and a tangentially arranged supply pipe discharging fluid tangentially into the cylinder to effect a rotary action of the fluid and the whirling of the fluid over the rim of the cylinder and a member at the bottom of the cylinder substantially closing the same and whereby the shell is divided into a bottom settling compartment and an upper compartment in which the tangentially incoming liquid is forced to rotate as it ascends to the top outlet of the shell.

HOWARD McCURDY.

REFERENCES CITED

The following references are of record in the file of this patent:

UNITED STATES PATENTS

| Number | Name | Date |
|---|---|---|
| 1,921,689 | Meurk | Aug. 8, 1933 |
| 1,301,544 | Crombie | Apr. 22, 1919 |
| 1,880,185 | Kerns et al. | Sept. 27, 1932 |
| 2,364,405 | Trimbey et al. | Dec. 5, 1944 |
| 1,522,903 | Pabodie | Jan. 13, 1925 |
| 2,364,799 | Laughlin et al. | Dec. 12, 1944 |
| 2,229,860 | McCurdy | Jan. 28, 1941 |
| 2,300,129 | McCurdy | Oct. 27, 1942 |
| 1,444,585 | Collins | Feb. 6, 1923 |
| 2,343,682 | McCurdy | Mar. 7, 1944 |
| 1,542,666 | Casablanca et al. | June 16, 1925 |
| 660,214 | Gathmann | Oct. 23, 1900 |
| 639,519 | Camiz et al. | Dec. 19, 1899 |
| 1,641,843 | Fisher | Sept. 6, 1927 |
| 1,724,693 | Carpita | Aug. 13, 1929 |
| 2,330,008 | Robinson | Sept. 21, 1943 |

FOREIGN PATENTS

| Number | Country | Date |
|---|---|---|
| 463,285 | Great Britain | Mar. 25, 1937 |